(No Model.)
J. P. LAVIGNE.
MICROMETER GAGE.
No. 488,281. Patented Dec. 20, 1892.
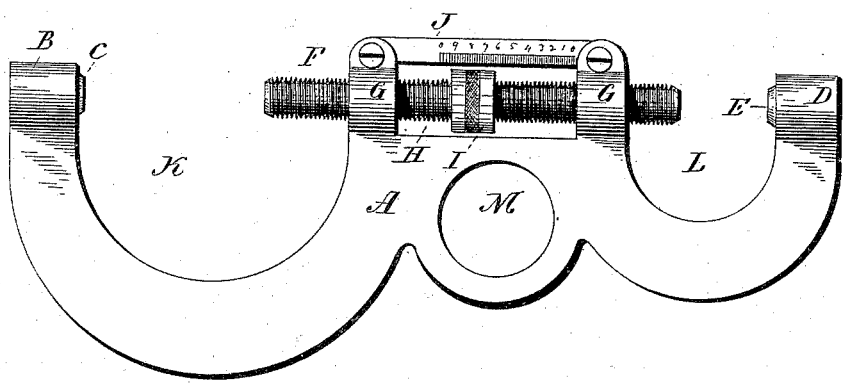

UNITED STATES PATENT OFFICE.

JOSEPH P. LAVIGNE, OF NEW HAVEN, CONNECTICUT.

MICROMETER-GAGE.

SPECIFICATION forming part of Letters Patent No. 488,281, dated December 20, 1892.

Application filed July 18, 1892. Serial No. 440,342. (No model.)

*To all whom it may concern:*

Be it known that I, JOSEPH P. LAVIGNE, of New Haven, in the county of New Haven and State of Connecticut, have invented a new Improvement in Micrometer-Gages; and I do hereby declare the following, when taken in connection with accompanying drawing and the letters of reference marked thereon, to be a full, clear, and exact description of the same, and which said drawing constitutes part of this specification and represents a side view.

This invention relates to an improvement in that class of gages of caliper-like character which are adapted to close and accurate measurement, commonly called "micrometer gages," and particularly to that class in which a longitudinal screw-spindle having a predetermined thread, say forty to the inch is arranged in bearings so that by rotation it will be moved longitudinally according to the extent of its thread toward and from a fixed point in the same gage, and so that an article placed between the end of the screw-spindle and the said fixed point, the screw-spindle may be moved up to the opposite side of the said article, and there brought to a stand, the space between the end of the screw-spindle and the said fixed point will correspond to the distance between the two bearing points on the article so standing between the end of the screw-spindle and the said fixed point. Combined with the screw-spindle of a predetermined thread, a stationary scale is arranged, graduated longitudinally according to the thread of the screw-spindle, and upon the screw is a rotating head, which running along said scale serves as an indicator on the scale, and this head being cylindrical, has a predetermined graduation upon its periphery, say divisions of twenty-fifths, which graduations in connection with said scale will indicate in thousandths the exact distance between the point of the screw-spindle and the fixed point in the gage. This is a common and well known construction of gage. Gages of this character are usually made with but a single space for measurement, consequently if the screw-spindle happen to be withdrawn to the fullest extent so as to make that space its maximum length, and the measurement required is much less than that space, then the screw-spindle must be run toward the fixed point accordingly, and vice-versa. For illustration, if the gage be adapted for two inch measurement, and the screw-spindle be near the open extreme, and the length to be measured is less than one inch, then the movement of the screw-spindle must be one full inch plus the extent of movement to bring it to a bearing upon the article to be measured within the next inch. Again, if the gage be closed, that is the end of the screw-spindle against the fixed point of the gage, and more than one inch is required, then the longitudinal movement of the screw-spindle must be made one full inch plus the additional movement required for the gage to embrace the article.

The object of this invention is to combine in one gage two spaces within one of which one end of the screw-spindle will operate, and in the other space the other end of the screw spindle will operate, one space being twice as great as the other, and so that should the article to be gaged be greater than that of the smaller space, the measurement may be made in the broader space with but a slight longitudinal movement of the screw-spindle, and vice-versa, and by which in many cases a very much less longitudinal movement of the screw will be required than in the usual construction of this class of micrometer-gages, and which have but a single measuring space, and in such a gage the invention consists.

In the illustration a gage is shown in which the two spaces for convenience are made the one to represent one inch opening and the other two inches.

A, represents the body of the gage, which at one end forms a head B, carrying a fixed bearing-point C, and at the other end is a similar head D, carrying a like fixed point E. Between these two heads the screw-spindle F, is arranged in longitudinal axial line with the said bearing-points C E; the screw is carried in the body of the gage in bearings G, threaded corresponding to the thread of the screw; in this illustration the thread of the screw is supposed to be forty to the inch.

Between the two bearings G G, is an open space H, within which the screw-spindle is exposed, and in this space on the spindle is a fixed head I, by means of which the screw-spindle may be conveniently revolved. The periphery of this head is graduated by twenty-five divisions in the supposed illustration of forty threads to the inch.

Above the spindle the scale-bar J, is arranged, parallel with the spindle, and secured by its two ends to the two bearings G G, the scale extends over the head and in substantially close contact therewith, but so as to allow the head to revolve freely. The scale is graduated corresponding to the threads of the screw, say forty to the inch, and the graduations as here shown represent one inch. The open space K between the head B, and the bearings G, is somewhat more than one inch, while the space L, at the other end between the head D, and the bearing G, is somewhat more than two inches, but the length of the screw-spindle F, is such that the space between the one end of the spindle and the fixed point C, plus the space between the other end of the spindle and the fixed point E shall be two inches, consequently when the spindle is adjusted so as to come to a bearing against the one fixed point C, there will be a space of two inches between the other end of the spindle and the fixed point E, and in this position the graduations on the scale and on the head will indicate 0. If then the spindle be turned to carry it to its other extreme, there will be a space of one inch between the fixed point E, and the corresponding end of the spindle, and in this case the indications on the scale and head are 0. In this position also there will be a space of just one inch between the fixed point C, and its corresponding end of the spindle. Now if an article is to be gaged or measured of less than one inch, that end of the gage which contains the space K, will be employed, and the spindle will be run in that direction toward the fixed point C, until the measurement is accomplished. But if the article to be gaged is more than one inch, then the other end of the gage will be employed, and the spindle will be run from the fixed point E, accordingly, until the desired adjustment is attained.

It will be observed that the gage has the full capacity from 0 to two inches, and that in a gage of like capacity having but a single gaging space of two inches, the movement of the screw-spindle would require twice the extent of longitudinal movement, under the circumstances of the foregoing illustration. The convenience of the gage thus constructed is too apparent to require further illustration.

The body of the gage is constructed with a finger-opening M, as a convenient means for holding the gage.

In making the illustration of the gage as having one inch space at one end and two inches at the opposite end, it will be understood that these are not fixed as to their extent, but in any case one space should be substantially twice the capacity of the other, one end being adapted to measure from 0 to one-half the capacity at the other end, and the said other end to measure from the full capacity of the one end to its own full capacity.

I claim.

A micrometer-gage consisting of a body constructed with two heads in longitudinal line with each other, each head carrying its own independent fixed point, combined with a longitudinal screw-spindle arranged in the body in axial line with the said two fixed points, and adjustable by its rotation toward or from either of said fixed points, one of said fixed points being normally distant from its end of the screw-spindle greater than the distance between the other fixed point and its end of the spindle, the screw provided with a graduated head which rotates with it, and a scale fixed to the body parallel with the said spindle and along which said head runs, substantially as described.

In testimony whereof I have signed this specification in the presence of two subscribing witnesses.

JOSEPH P. LAVIGNE.

Witnesses:
FRED. C. EARLE,
J. H. SHUMWAY.